73. MEASURING AND TESTING.
290
M. P. SHIELDS.
WATER INDICATOR FOR LOCOMOTIVE TENDERS.
APPLICATION FILED NOV. 7, 1913.
1,210,007.
Patented Dec. 26, 1916.
Draftsman's Copy.
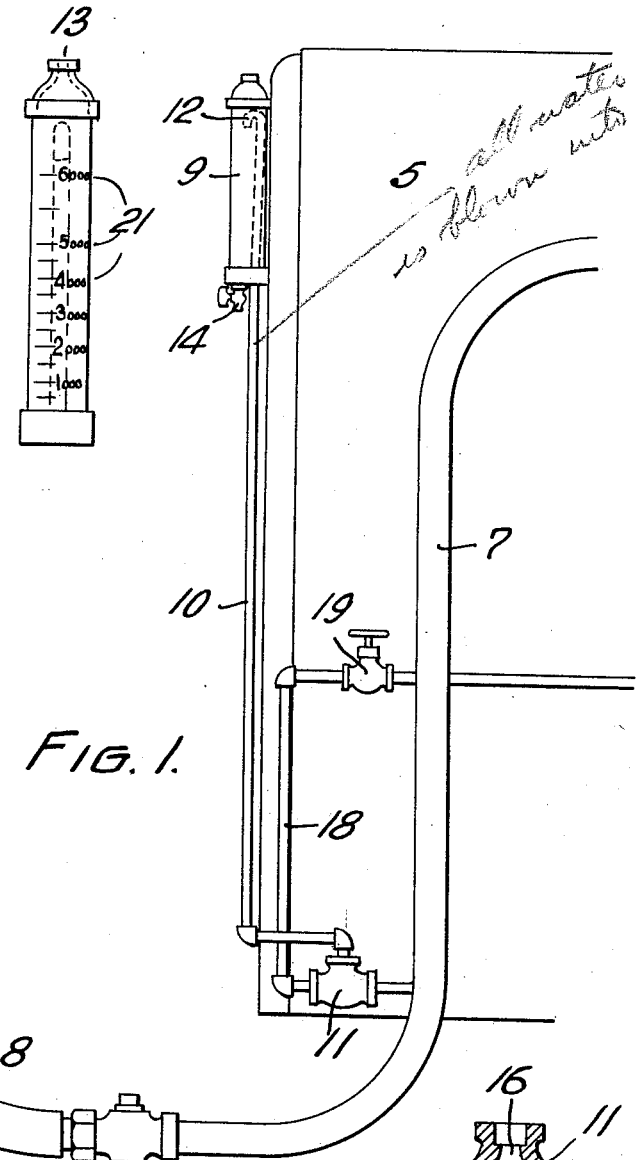
Witnesses
Inventor
M. P. Shields
By Fred B. Fetherstonhaugh
His Attorney

UNITED STATES PATENT OFFICE.

MICHAEL P. SHIELDS, OF QUEBEC, QUEBEC, CANADA.

WATER-INDICATOR FOR LOCOMOTIVE-TENDERS.

1,210,007. Specification of Letters Patent. Patented Dec. 26, 1916.

Application filed November 7, 1913. Serial No. 799,733.

*To all whom it may concern:*

Be it known that I, MICHAEL P. SHIELDS, of the city of Quebec, in the Province of Quebec and Dominion of Canada, have invented certain new and useful Improvements in Water-Indicators for Locomotive-Tenders, of which the following is a full, clear, and exact description.

This invention relates to improvements in water indicators for locomotive tender tanks, and the object is to provide a simple, inexpensive and reliable apparatus by means of which the engineer or fireman will be able to determine accurately the amount of water in the tender tank without going back into the tender and sounding to ascertain the level.

At the present time, no means is provided for determining the amount of water in a locomotive tender, and the only way in which the amount on hand may be known is to open the filling plug at the rear of the tender and take soundings with any convenient instrument. This method is inconvenient and unreliable owing to the irregular shape of the tank. The present invention aims to overcome this disadvantage by providing a gage in the locomotive cab which may be operated at any time to indicate in gallons, cubic feet or other suitable measurement the actual amount of water in the tender tank.

The device consists of a small stand pipe in which the water stands at the same level as in the tank. Means are provided for blowing the water out of this stand pipe into a gage graduated to indicate from the amount of water delivered thereto the amount of water in the tank.

In the drawings which illustrate the invention:—Figure 1 is a fragmentary side elevation of a locomotive and tender. Fig. 2 is a front elevation of the gage. Fig. 3 is a sectional view of the automatic cut off valve.

Referring more particularly to the drawings, 5 designates the boiler of a locomotive and 6 the tender tank, which is connected to the injector suction pipe 7 of the locomotive through the flexible pipe 8 in the usual manner. A tube 9 preferably of glass is mounted in a convenient position on the boiler. A stand pipe 10 of suitable diameter is provided having its lower extremity substantially level with the bottom of the tender tank. This stand pipe is connected through an automatic cut-off valve 11 with the injector pipe 7, so that it is in communication with the tank and water will stand at the same level in the pipe 10 as in the tank 6. The pipe 10 projects upwardly inside the gage tube 9 and is turned downwardly at the top thereof, as indicated at 12. An air vent 13 is provided at the top of the gage tube and a drain cock 14 at the bottom.

The cut-off valve 11 has three intersecting passages 15, 16 and 17 therein connected respectively with the injector pipe 7, the stand pipe 10 and an air pipe 18, leading from the air reservoir of the locomotive. Air flow through this pipe is controlled by the valve 19. At the intersection of the three passages, a ball 20 is located, the valve being disposed so that this ball will close either the passage 15 or 17 but will not under ordinary circumstances close the passage 16 leading to the stand pipe. The tube 9 is provided with a scale 21 reading in gallons, cubic feet or other suitable measure, said scale being arranged in accordance with the capacity of the tank.

The operation of the device is extremely simple. Normally, the ball 20 is in the position shown in Fig. 3, that is closing the passage 17 leading to the air pipe 18, so that water will not enter this air pipe. The water thus has free passage from the injector pipe, through the passages 15 and 16 of the valve into the stand pipe 10. When it is desired to ascertain the amount of water in the tender tank, the valve 19 is opened to admit air through the passage 17, thus forcing the ball 20 across the valve to close the passage 15 and prevent entry of any further water. The air seeking the only outlet, which is through the passage 16 and pipe 10, blows all the water in the pipe 10 up into the gage tube 9. The downwardly turned end 12 of the pipe prevents the water being blown out through the aperture 13 in the top of the gage, which permits the escape of air. The reading on the scale 21 indicated by the level of water in the tube 9 tells the amount of water in the tank. The degrees of the scale will not necessarily be equidistant, as the capacity of tender tanks is not always proportional to the height of water therein. When all the water has been blown out of the stand pipe 10, the valve 19 is closed and the ball valve 20 is forced to its original position by water pressure, the water again rising in the pipe 10 to the same level as in the tank. When the amount of water in the tank has been noted, the drain cock 14 is opened and the tube 9 emptied. The injector of the locomotive will be prevented from drawing air from the pipe 10 by the ball 20, which will be drawn by the suction to close the passage 15.

Having thus described my invention, what I claim is:—

1. A device of the character described comprising a tank, a gage tube, a pipe remote from said tank and adapted to contain a depth of water equal to the depth of water in the tank, means normally preventing the water from the tank from being forced into said gage tube, and pneumatic means for forcing water from said pipe into the gage tube.

2. A device of the character described comprising a graduated tube having an air vent at the top thereof, a tank, a pipe adapted to contain a column of water equal in height to the height of water in the tank, said pipe projecting into the graduated tube and terminating adjacent the upper portion thereof, means normally preventing the water from said pipe being forced into the graduated tube, and an air pipe connected to said means whereby water from said pipe will be pneumatically forced into the graduated tube.

3. In a device of the character described, the combination of a tank, of a water column pipe normally communicating with the tank and adapted to contain a column of water equal in height to the depth of water in the tank, a graduated tube surrounding the upper portion of said water column pipe, an air pipe connected to the bottom of said water column pipe, and a valve connecting the water column pipe, air pipe and water supply pipe adapted to close the air pipe against entry of water during the flow of water from the water supply pipe to the water column pipe and to close communication between the water supply pipe and water column pipe during air flow through the air pipe.

4. The combination with a tank of a gage tube and water connections between the tank and gage tube, a graduated scale on said gage tube spaced according to the capacity of the tank at different levels, a water column pipe leading from the water connection and adapted to contain a column of water equal in height to the height of water in the tank, pneumatic means for forcing said column of water into the gage tube, and a valve operating automatically to sever communication between the tank and water column pipe during said water forcing operation.

In witness whereof, I have hereunto set my hand, in the presence of two witnesses.

MICHAEL P. SHIELDS.

Witnesses:
JOHN B. FISHER,
J. A. VERRAULT.

Copies of this patent may be obtained for five cents each, by addressing the "Commissioner of Patents, Washington, D. C."